(12) United States Patent
Pjesivac-Grbovic et al.

(10) Patent No.: US 9,424,074 B1
(45) Date of Patent: Aug. 23, 2016

(54) METHOD FOR LEARNING BACKUP POLICIES FOR LARGE-SCALE DISTRIBUTED COMPUTING

(71) Applicant: Google Inc., Mountain View, CA (US)

(72) Inventors: Jelena Pjesivac-Grbovic, Mountain View, CA (US); Kenneth Jerome Goldman, Palo Alto, CA (US); Matthew Faulkner, Pasadena, CA (US); Wesley Kendall, Powell, TN (US)

(73) Assignee: Google Inc., Mountain View, CA (US)

( * ) Notice: Subject to any disclaimer, the term of this patent is extended or adjusted under 35 U.S.C. 154(b) by 240 days.

(21) Appl. No.: 14/318,993

(22) Filed: Jun. 30, 2014

Related U.S. Application Data (60) Provisional application No. 61/841,533, filed on Jul. 1, 2013.

(51) Int. Cl.
*G06F 9/46* (2006.01)
*G06F 9/48* (2006.01)

(52) U.S. Cl.
CPC ...................................... *G06F 9/48* (2013.01)

(58) Field of Classification Search
None
See application file for complete search history.

(56) References Cited

U.S. PATENT DOCUMENTS

| | | | | |
|---|---|---|---|---|
| 7,590,620 B1* | 9/2009 | Pike | ................... | G06F 11/1482 |
| 7,650,331 B1* | 1/2010 | Dean | ...................... | G06F 9/5066 |
| | | | | 712/203 |
| 8,443,367 B1* | 5/2013 | Taylor | ....................... | G06F 9/52 |
| | | | | 718/1 |
| 8,478,952 B1* | 7/2013 | Armorer | ............. | G06F 11/1464 |
| | | | | 711/111 |
| 8,793,691 B2* | 7/2014 | Devadhar | ............... | G06F 9/546 |
| | | | | 707/E17.001 |
| 8,869,156 B2* | 10/2014 | Aulakh | ................. | H04L 47/621 |
| | | | | 709/224 |
| 2007/0136541 A1* | 6/2007 | Herz | ................... | G06F 11/1464 |
| | | | | 711/162 |
| 2007/0214394 A1* | 9/2007 | Gross | ................... | G06F 11/2025 |
| | | | | 714/47.1 |
| 2010/0122065 A1* | 5/2010 | Dean | ................. | G06F 17/30445 |
| | | | | 712/203 |
| 2010/0306486 A1* | 12/2010 | Balasubramanian | | G06F 11/1458 |
| | | | | 711/162 |
| 2013/0031459 A1* | 1/2013 | Khorashadi | ....... | G06F 17/30905 |
| | | | | 715/234 |
| 2013/0219395 A1* | 8/2013 | Geibel | .................. | G06F 9/5072 |
| | | | | 718/101 |
| 2014/0096138 A1* | 4/2014 | Dean | ................. | G06F 17/30445 |
| | | | | 718/102 |
| 2015/0106308 A1* | 4/2015 | Harrison | ................ | G06N 5/043 |
| | | | | 706/12 |
| 2015/0227426 A1* | 8/2015 | Andrade Costa | ... | G06F 11/1415 |
| | | | | 714/47.3 |

OTHER PUBLICATIONS

Samantha Ranaweera and Dharma P. Agrawal, A Task Duplication Based Scheduling Algorithm for Heterogeneous Systems, 2000, 6 pages.
Doruk Bozdag, Füsun Özgüner, Eylem Ekici, and Umit Catalyurek, A Task Duplication Based Scheduling Algorithm Using Partial Schedules, 2005, 8 pages.
Ming Wu, A General Self-Adaptive Task Scheduling System for Non-Dedicated Heterogeneous Computing, 2003, 11 pages.
Sunita Bansal, Bhavik Kothari and Chittaranjan Hota, Dynamic Task-Scheduling in Grid Computing using Prioritized Round Robin Algorithm, Mar. 2011, 6 pages.
googleresearch.blogspot.com/2010/04/lessons-learned-developing-practical-html, Apr. 6, 2010, 2 pages.

* cited by examiner

*Primary Examiner* — Emerson Puente
*Assistant Examiner* — Mehran Kamran
(74) *Attorney, Agent, or Firm* — Lerner, David, Littenberg, Krumholz & Mentlik, LLP (57) ABSTRACT

Aspects of the disclosure relate to learning the most useful backup tasks when processing a job in a distributed computing application. For example, training data may be generated by running a job and running backup tasks for some of the tasks for that job. List of features may be generated for each backup task at different times. A representative list of features may be labeled according to the backup tasks usefulness to the job. The lists and usefulness labels may be used to generate a model of usefulness. The model may then be used to evaluate the usefulness of the tasks for the next job. This information may then be used to schedule backup tasks for execution. In addition, lists of features for these backup tasks may be generated and then used to update the model in a continuous learning loop.

20 Claims, 3 Drawing Sheets

METHOD FOR LEARNING BACKUP POLICIES FOR LARGE-SCALE DISTRIBUTED COMPUTING

The present application claims the benefit of the filing date of U.S. Provisional Patent Application No. 61/841,533 filed Jul. 1, 2013, the disclosure of which is hereby incorporated herein by reference.

BACKGROUND

Large-scale distributed computing systems may be used to process data in efforts known as jobs. Each job may be made up a plurality of tasks. A task may be considered a unit of computation and fault tolerance. For example, interrupting a task during computation means that the task will have to be recomputed from the beginning, or restarted from a previously check-pointed state.

Several factors may impact the amount of time needed to complete a job. The overall job running time may be the time from when the first task starts until the last required task finishes. An individual task's running time may depend on the availability of the task inputs, task computation time, and the time to produce/write output of the task.

Additionally, in a shared computing environment a task can be preempted or killed, for example by an unrelated machine failure, in which case it may need to be restarted. Other tasks may be slow, for example, because they are running on overloaded machines. Such failures and slow tasks can cause other tasks to become stragglers, meaning that the tasks are lagging behind the overall progress of the remaining tasks in the job.

MapReduce is an example of a high level, large scale data processing framework that uses jobs defined by a plurality of tasks to allow users to express their applications using map and reduce operators. The input data set may be divided into shards, shards are processed by mappers that produce key value pairs as map output, and then the map output may be sent to reducers where all values with the same key are combined to produce a final value for each key. Each reducer may be responsible for a subset of the keys. The process by which data may be sent to reducers may be called shuffling, and results in each reducer getting, from every mapper, the key value pairs for which that reducer may be responsible. The MapReduce framework may be responsible for automatically partitioning and executing in parallel the user specified computation on a computer cluster. In this example, each task may be a map or reduce task. The instance of the MapReduce framework, together with user specified computation, and user specified inputs and outputs may be referred to as a job. A MapReduce job may be considered done when every reduce task finishes.

The running time of the job in a cluster, such as in the MapReduce example described above, may be dominated by running time of straggler tasks. In some instances, more than half of the overall running time for a job may be spent in processing the last 5% of tasks due to failures or other problems. In addition to address such issues, failed tasks may be replaced and straggler tasks may be duplicated. In this regard, backup tasks may be run. For these backup tasks to be most effective, it is important to properly identify straggler and/or long running tasks.

Previously, attempts have been made to select which backup tasks or backup candidates to run in a largely manual effort. For example, one would first define a small number of features relevant to the decision about whether to create a backup. These features may include the relative size of a task, the average processing rate for a task, whether the computer processing that task is slow, whether a computer is having issues reading the output of the task, whether the task is the last needed to complete the job, etc. The features are thus possibly dynamically changing properties of a given task that can be monitored and can be based on at least any statistics available during execution of a corresponding job. Features may also be continuous or discrete. Some features may be static (a property assigned at the beginning of a job and that remains constant throughout the job), global (a property computed periodically and describe the state of the job as a whole and are the same for all backup tasks), or individual (a property computed continuously for each backup task). As an example, in the MapReduce context, a static feature may include "has-output-to-bigtable"=1, a global property may include "map-phase-progress"=0.7, and an individual feature may include "number-of-shuffler-read-errors-for-output-from-this-task"=4.

Each of these features are assigned a weighted value indicative of how important the feature is when determining whether to run backup tasks. These values have typically been assessed manually by referencing failed or straggler tasks in previous jobs. For example, while the job is being computed, the system may temporarily store information about the features for each task for display on a status page in a web browser. However, the information for each feature is typically not collected continuously. An operator reviewing the status page may notice that a job is stuck. In some systems, the computing system may send a message indicating that certain jobs are stuck. A human operator may then need to review the status information for the job in order to determine which tasks are problematic. The operator may then use this information to make an educated guess as to the importance of certain features to backup determinations. In this regard, an operator may manually select weights for different types of features. These weights can then be "hard coded".

For example, when a new job is to be run, the computing system may calculate a weighted average for each task of the new job. The computer may then use the weighted average to rank the importance of running a backup for each task of that job. For example, if there are 10 available computers, and each is able to execute 2 tasks at a time, 20 highest ranked backups (according to the preselected, weighted sum of feature scores) can be automatically selected to run on these computers. In production, an operator may observe that the job is stuck with given set of feature scores.

To address that problem, the operator may again manually adjust features weights and/or add new features to the code. Thus, the manually determined feature weights may be updated in the code over time. However, as the feature weights are fixed for a given job, or rather, set at the beginning of a job, they can only be changed for subsequent jobs.

SUMMARY

One aspect of the disclosure provides a method. The method includes running a first job including a plurality of tasks, while also running a backup task for a given task of the plurality of tasks; generating a first list of features before the backup task is run and a second list of features at a time after the backup task finishes, wherein each feature of the first or second list of features describes an aspect of the execution of the backup task or the first job; determining, by a processor, usefulness of the backup task based on at least both the first list of features and the second list of features, where usefulness of the backup task is defined by whether the output of the task is used in order to complete the first job; assigning a usefulness label to the backup task based on at least the determined usefulness; generating a model of usefulness of backup tasks based on at least the first list of features and the assigned usefulness label; while running a second job having a second plurality of tasks, generating a list of features for each task of the second plurality of tasks; for each given task of the second plurality of tasks, determining a usefulness score based on at least the model and the lists of features for that task; selecting a subset of tasks from the second plurality of tasks based on at least the usefulness scores; and running a backup task for each task of the subset of tasks.

In one example, assigning a usefulness label includes assigning a value representing whether the backup task was useful to the running of the first job. In another example, assigning a usefulness label includes determining whether the backup task of the first job was useful, not useful, or possibly useful to the first job. In another example, generating the model includes using a machine learning algorithm. In another example, selecting the second subset and starting the backup task for each task of the subset of tasks are performed periodically. In another example, the method also includes generating a list of features for each backup task for the subset of tasks; determining usefulness of each backup task for the subset of jobs based on at least the list of features for that backup task; and updating the model based on at least the determined usefulness of each backup task for the subset of jobs and the list of features for each backup task for the subset of jobs.

In another example, the method also includes generating an additional list of features for the backup task at a different time from the first and second lists of features of the backup task, and wherein determining the usefulness of the backup task is further based on at least the additional list of features. In this example, the backup task is determined to be not useful, and the method further comprises: receiving auxiliary information indicating that a primary task corresponding to the backup task finished before the backup task and that if the backup task was scheduled at or before the time that the additional list of features was generated, the backup task would have been useful; and labeling the additional list of features as useful, and wherein generating the model is further based on at least the additional list of features and the useful label of the additional list of features. As an alternative, the first list of features is determined at time T, the second list of features is determined at a time T+Δt, and the additional list of features is determined at a time after T+Δt. In another alternative, the additional list of features is generated as a random sample before the first list of features is generated.

In another example, the method also includes receiving additional information including a starting time and completion time for a primary task associated with the backup task, and wherein determining the usefulness of the backup task is further based on at least the additional information. In another example, the method also includes receiving additional information including a starting time and completion time for the job, and wherein determining the usefulness of the backup task is further based on at least the additional information.

Another aspect of the disclosure provides a system. The system includes memory storing model of usefulness of backup tasks and a processor configured to access the memory. The processor is also configured to run a first job including a plurality of tasks, while also running a backup task for a given task of the plurality of tasks; generate a first list of features before the backup task is run and a second list of features at a time after the backup task finishes, wherein each feature of the first or second list of features describes an aspect of the execution of the backup task or the first job; determine usefulness of the backup task based on at least both the first list of features and the second list of features, where usefulness of the backup task is defined by whether the output of the task is used in order to complete the first job; assign a usefulness label to the backup task based on at least the determined usefulness; generate the model of usefulness of backup tasks based on at least the first list of features and the assigned usefulness label; while running a second job having a second plurality of tasks, generate a list of features for each task of the second plurality of tasks; for each given task of the second plurality of tasks, determine a usefulness score based on at least the model and the lists of features for that task; select a subset of tasks from the second plurality of tasks based on at least the usefulness scores; and run a backup task for each task of the subset of tasks.

In an example, the processor is also configured to assign the usefulness label by assigning a value representing whether the backup task was useful to the running of the first job. In another example, the processor is also configured to assign the usefulness label by determining whether the backup task of the first job was useful, not useful, or probably useful to the first job. In another example, the processor is also configured to generate the model using a machine learning algorithm. In another example, the processor is also configured to select the second subset and to start the backup task for each task of the subset of tasks periodically. In another example, the processor is also configured to generate a list of features for each backup task for the subset of tasks; determine usefulness of each backup task for the subset of jobs based on at least the list of features for that backup task; update the model based on at least the determined usefulness of each backup task for the subset of jobs and the list of features for each backup task for the subset of jobs.

In another example, the processor is also configured to generate an additional list of features for the backup task at a different time from the first and second lists of features of the backup task, and wherein determining the usefulness of the backup task is further based on at least the additional list of features. In this example, the backup task is determined to be not useful, and the processor is also configured to receive auxiliary information indicating that a primary task corresponding to the backup task finished before the backup task and that if the backup task was scheduled at or before the time that the additional list of features was generated, the backup task would have been useful, label the additional list of features as useful, and generate the model further based on at least the additional list of features and the useful label of the additional list of features. As an alternative, the processor is also configured to determine the first list of features at time T, to determine the second list of features at a time T+Δt, and to determine the additional list of features at a time after T+Δt. In another alternative, the processor is also configured to generate the additional list of features as a random sample before the first list of features is generated.

DETAILED DESCRIPTION

The present disclosure relates generally to learning which tasks, operations, etc. should also be executed as backup tasks when processing a job in a distributed computing environment. For example, as noted above, with an environment such as MapReduce, mapping, reducing and shuffling tasks may fail, run slowly, or need to be repeated in order to run a dependent task or complete the MapReduce job.

As an example, training data may be generated by running a job and running backup tasks for some of the tasks for that job. List of features may be generated for each backup task at different times. A representative list of features may be labeled according to the backup tasks usefulness to the job. The lists and usefulness labels may be used to generate a model of usefulness. The model may then be used to evaluate the usefulness of the tasks for the next job. This information may then be used to schedule backup tasks for execution. In addition, lists of features for these backup tasks may be generated and then used to update the model in a continuous learning loop.

Figure 1:
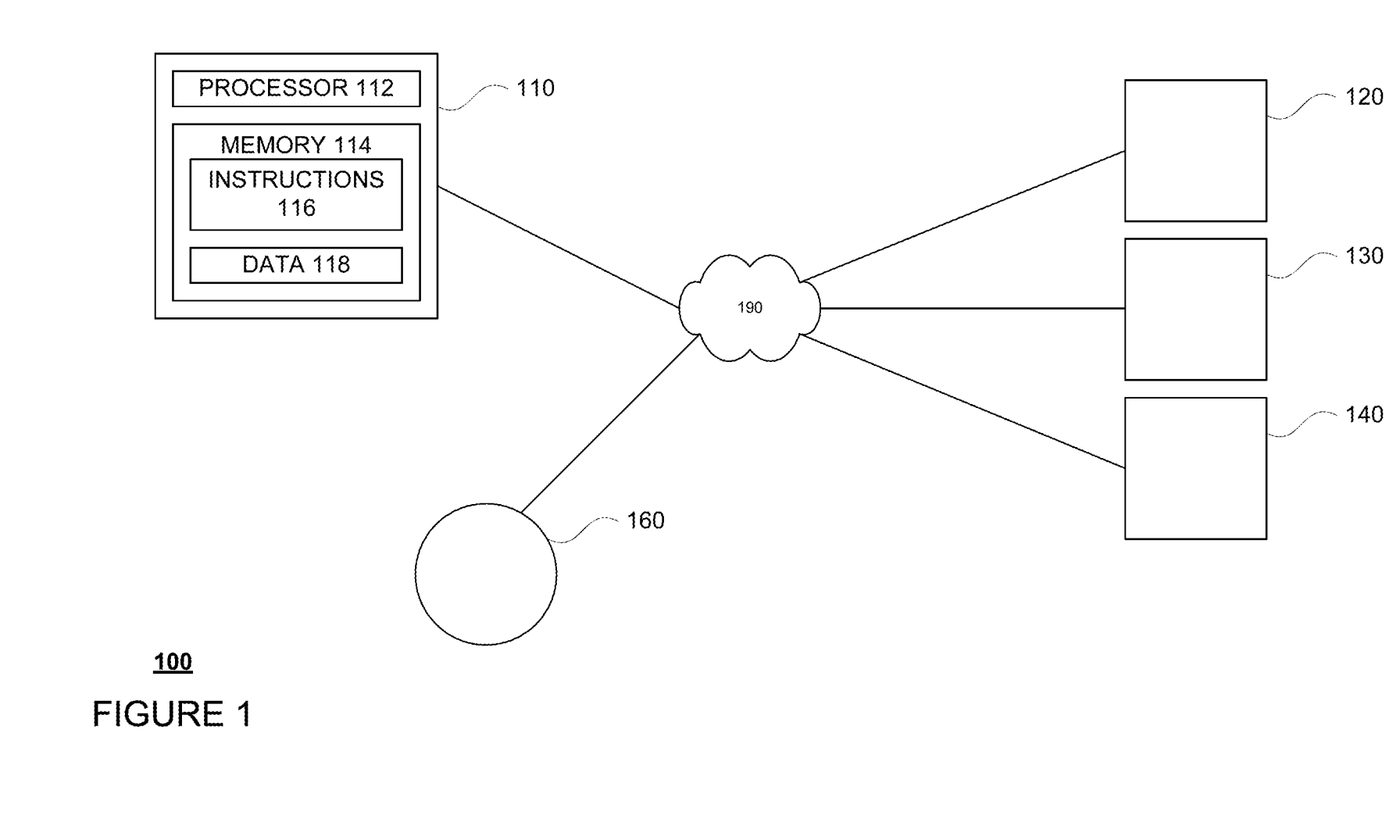
FIG. 1 is a functional diagram of a system in accordance with aspects of the disclosure.
Figure 2:
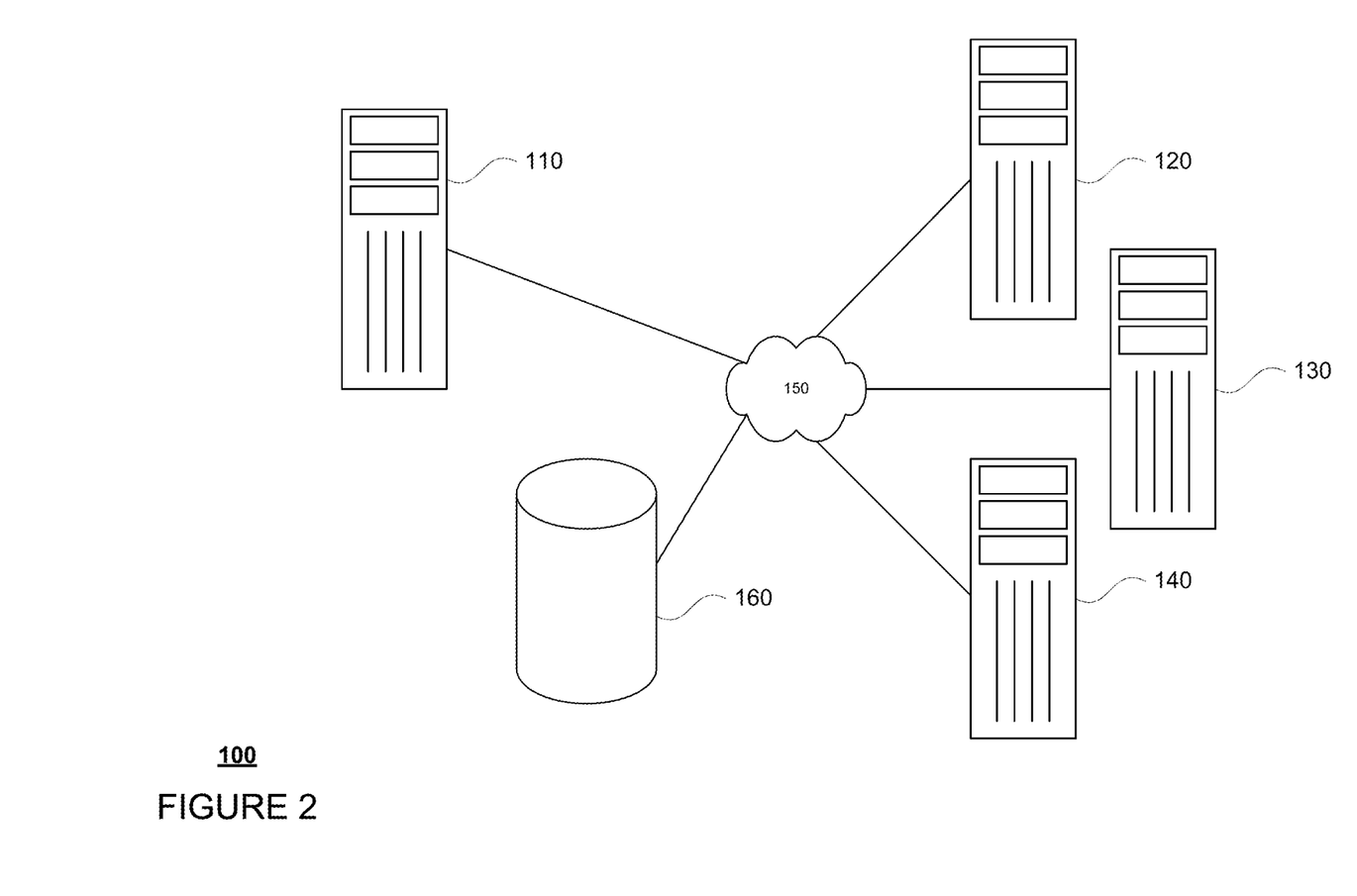
FIG. 2 is a pictorial diagram of the system of FIG. 1.

As shown in FIGS. 1-2, a system 100 which is used herein as an example system in which backup task selection features described herein may be implemented. It should not be considered as limiting the scope of the disclosure or usefulness of the features described herein. In this example, system 100 can include computers 110, 120, 130, 140, and storage system 160. Computer 110 can include a processor 112, memory 114 and other components typically present in general purpose computers. Memory 114 of computer 110 can store information accessible by processor 112, including instructions 116 that can be executed by the processor 112.

Memory can also include data 118 that can be retrieved, manipulated or stored by the processor. The memory can be of any type capable of storing information accessible by the processor, such as a hard-drive, memory card, ROM, RAM, DVD, CD-ROM, write-capable, and read-only memories.

The instructions 116 can be any set of instructions to be executed directly, such as machine code, or indirectly, such as scripts, by the processor. In that regard, the terms "instructions," "application," "steps" and "programs" can be used interchangeably herein. The instructions can be stored in object code format for direct processing by the processor, or in any other computer language including scripts or collections of independent source code modules that are interpreted on demand or compiled in advance. Functions, methods and routines of the instructions are explained in more detail below.

Data 118 can be retrieved, stored or modified by processor 112 in accordance with the instructions 116. For instance, although the subject matter described herein is not limited by any particular data structure, the data can be stored in computer registers, in a relational database as a table having many different fields and records, or XML documents. The data can also be formatted in any computer-readable format such as, but not limited to, binary values, ASCII or Unicode. Moreover, the data can comprise any information sufficient to identify the relevant information, such as numbers, descriptive text, proprietary codes, pointers, references to data stored in other memories such as at other network locations, or information that is used by a function to calculate the relevant data.

The processor 112 can be any conventional processor, such as commercially available CPUs. Alternatively, the processor can be a dedicated device such as an ASIC, FPGA, or other hardware-based processor. Although FIG. 1 functionally illustrates the processor, memory, and other elements of computer 110 as being within the same block, the processor, computer, or memory can actually comprise multiple processors, computers, or memories that can or cannot be stored within the same physical housing. For example, memory can be a hard drive or other storage media located in a housing different from that of computer 110. Accordingly, references to a processor, computer, or memory will be understood to include references to a collection of processors, computers, or memories that can or cannot operate in parallel.

The computer 110 can be at one node of a network 150 and capable of directly and indirectly communicating with other nodes, such as computers 120, 130, 140 as well as storage system 160, of the network. The network 150 and intervening nodes described herein, can be interconnected using various protocols and systems, such that each can be part of the Internet, World Wide Web, specific intranets, wide area networks, or local networks. These can use standard communications protocols or those proprietary to one or more companies, Ethernet, WiFi and HTTP, and various combinations of the foregoing. Although only a few devices, here computers and a database, are depicted in FIGS. 1 and 2, any number of other devices and other types of devices, including client devices such as personal computers, mobile phones, set top boxes, etc., may also be connected to network 150 and send and receive information with computers 110, 120, 130, and 140 or storage system 160 by way of network 150.

Each of computers 120, 130, and 140 can be configured similarly to the computer 110, with a processor, memory, instructions, and data, similar to processor 112, memory 114, instructions 116, and data 118. As an example, computers 120, 130 and 140 may be worker computers configured to process tasks for various jobs. In the MapReduce example, computer 110 or computer 120 may be a master computer which assigns tasks to the worker computers in order to complete a job. Although FIGS. 1 and 2 depict computers 110, 120, 130, and 140 as singular devices, these devices may each represent many master or worker computers.

Storage system 160 may store data accessible by computers 110, 120, 130, and 140, such as that needed for processing tasks of the jobs. For example, storage system may include a database or other file system that stores the input or output of one or more jobs. Storage system 160 and/or data 118 of computer 110 may store models of usefulness and lists of features generated for various tasks as described in detail below. Like computers 110, 120, 130, and 140, storage system 160 may represent many databases or other storage devices.

The instructions of computer 110 may also store one or more machine learning algorithms. As an example, machine learning algorithms may be used to generate models for various purposes. Supervised learning algorithms may use as inputs a dataset containing pairs of examples and labels for corresponding example. The examples may include vectors of numbers and the labels may be either continuous values such as 0.0 to 1 or discrete labels such as "yes" or "no." Supervised learning algorithms may output a function that predicts the label of new examples. For continuous labels, this is often called a regression functions, and for discrete labels, it is called a classifier.

As described in more detail below, these machine learning algorithms may include supervised or unsupervised machine learning algorithms used to generate the models of usefulness.

Although certain advantages are obtained when information is transmitted or received as noted above, other aspects of the subject matter described herein are not limited to any particular manner of transmission of information. For example, in some aspects, information can be sent using a medium such as, but not limited to, a disk, tape or CD-ROM. Yet further, although some functions are indicated as taking place on a single computer having a single processor, various aspects of the subject matter described herein can be implemented by a multiple of computers, for example, communicating information over network 150.

In addition to the operations described below and illustrated in the figures, various operations will now be described. It should also be understood that the following operations do not have to be performed in the precise order described below. Rather, various steps can be handled in a different order or simultaneously. Steps can also be omitted unless otherwise stated.

Figure 3:
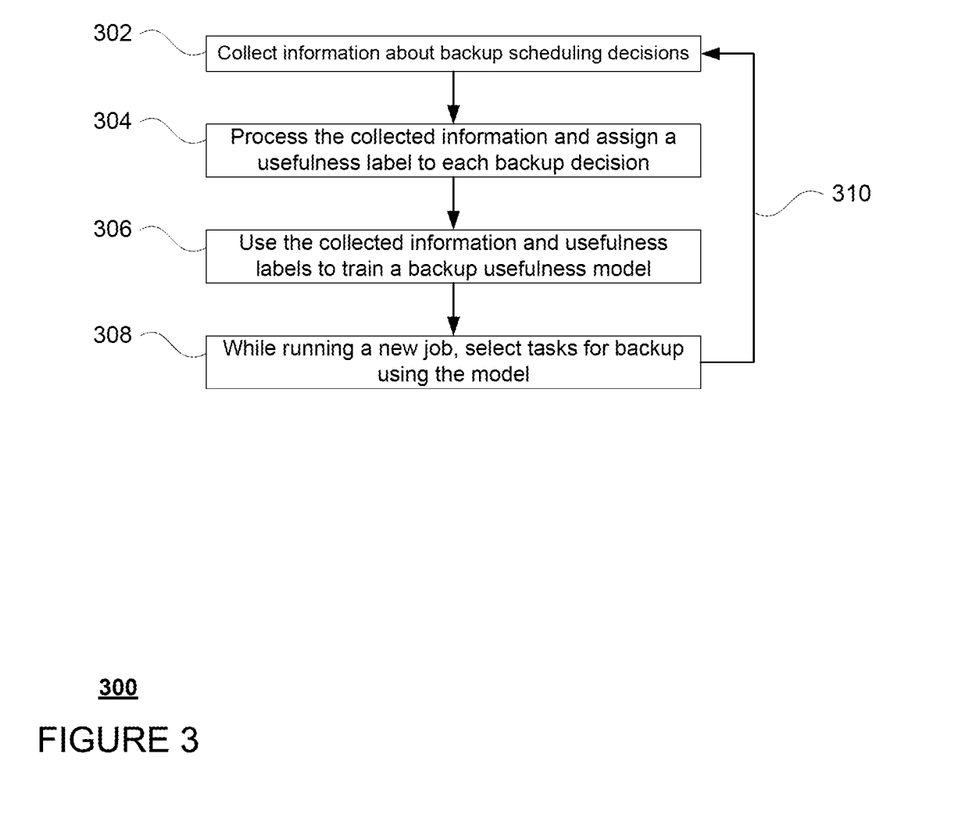
FIG. 3 is an example flow diagram in accordance with aspects of the disclosure.

In order to increase the efficiency of the entire system 100, a computer, such as computer 110, may perform all or some of the steps of the example flow diagram 300 of FIG. 3, in order to identify backup candidates. In the example of FIG. 3, information about backup scheduling decisions may be collected at block 302. This may include collecting features information for backup tasks in a plurality of different jobs. These "initial" backup tasks may be identified using the weighted average method described above.

Data regarding the features of each of the initial backup tasks may be collected or recorded. For example, for each initial backup task, various lists of features describing aspects of the given task may be generated at various times. For example, separate lists of features may be generated, for example, at the time a backup task is selected or scheduled for execution, immediately after the backup task has completed, as well as some predetermined period of time (such as a few minutes) after a backup task has completed. In addition or alternatively, lists of features may be generated periodically, for example, every second, few seconds, minute, few minutes, etc., though longer or shorter periods may also be used.

Accordingly, each backup task may be associated with many different lists of features collected at different times. As an example, for a given backup task S, it may be possible to have a first list of features collected at a time t, a second list of features collected at a time t+Δt1, a third list of features collected at a time t+Δt1+Δt2, a fourth list of features collected at a time t+Δt1+Δt2+Δt3, and so on. The first list of features may be generated at the time the backup task S is scheduled for execution. The second list of features may be generated a few second later or immediately after the backup task has completed. The third list of features may be generated two minutes after a backup task has completed. The fourth list of features may be generated five minutes after a backup task has completed. Alternatively, the second list of features may be generated a second after the first list of features, the third list of features may be generated a second after the second list of features, and the fourth list of features may be generated a second after the third list of features. Thus, the amount of time for each of Δt1, Δt2, Δt3 of these example may the same or different.

In some examples, a list of features may be randomly sampled. This random sampling may be done in order to collect additional data points for only some backup tasks. As will be described in more detail below, if determined to be useful, these random sample lists of features may also be used to generate a model. Thus, for a given backup task S2, it may be possible to have a list of features randomly sampled at a time t, a first list of features at a time t+Δt1, a second list of features at a time t+Δt1+Δt2, a third list of features at a time t+Δt1+Δt2+Δt3, and so on. In another example, for a given backup task S3, it may be possible to have a first list of features at a time t, a second list of features at a time t+Δt1, a list of features randomly sampled at a time t+Δt1+Δt2, a third list of features at a time t+Δt1+Δt2+Δt3, and so on. Again, the amount of time for each of Δt1, Δt2, Δt3 of these example may the same or different.

As noted above, the lists of features may include task size, average processing rate, whether the worker machine running the task is slow, whether another machine is having trouble reading the output of the task, whether the task is critical to completion of the job (e.g. it is the last task to be completed for the job), as well as combinations of individual features.

Once the various lists of features for a particular initial backup task have been generated, they may be analyzed by the computer to determine the usefulness of that initial backup task to the job for which it was run. For example, as shown in block 304, the computer may process the collected information and assign a usefulness label to each backup decision. Thus, although the computer may analyze a number of different lists of features for a given backup task, the label may be assigned to only one of the lists of features. For example, for a task having a plurality of lists of features, only a single representative list of features may be associated with the label, such that the other lists of features are not assigned or otherwise associated with the label. This single representative list of features may be, for example, a list of features generated when the backup task was scheduled for execution.

The labels may indicate whether according to the lists of features each backup task was useful, not useful, or neither (probably useful or unsure if the backup task was actually useful). In this example, the labeling of the representative list of features for each backup task may be made based on when the backup task finished versus the entire job and/or whether the output of the backup task was read and/or additional criteria. In other words, if the backup task finished after the rest of the job or the output was not read, it would not be useful. Thus, if the output were read, tat backup task may be labeled as useful. If the backup task finished before the end of the job, but the job continued without reading the output, this may be "neither."

In some examples, rather than being labeled, a representative list of features for an initial backup task may be assigned a usefulness score. Using the useful, not useful or neither label example above, the corresponding usefulness scores may be 1 (useful), 0 (not useful), and 0.5 (neither). Various other labeling and valuation schemes may also be used, such as where a useful task is valued at 0 and a not useful task is valued at 1, etc.

The labeled representative lists of features for the initial backup tasks and the corresponding labels themselves may be used as training data to generate a backup usefulness model. For example, as shown in block 306, the collected information about the initial backup tasks and usefulness scores are used to train a backup usefulness model. However, as noted above, for each backup task, although many lists of features may be generated at different times, only one of those lists of features is assigned the label. Thus, the non-labeled lists of features may not be used to train the model.

The model may be trained or generated using a machine learning algorithm such as a supervised machine learning algorithm. In this regard, the lists of features and the corresponding labels are inputs for the supervised machine learning algorithm. Thus, the machine learning algorithm may consider useful, not useful, and neither useful nor not useful backup tasks. If the labels are associated with usefulness scores, the usefulness scores may be inputs into the machine learning algorithm, rather than the actual labels themselves. The output of the supervised machine learning algorithm is the model. As discussed below, this model may be used as input to a classifier for making backup decisions for future job executions.

In some examples, additional lists of features for a given backup task may also be labeled and used to train the model. For example, it may be possible that a random sample may be labeled and used to train the model. Consider that the following lists of features are collected:
  a random sample at time t
  a first list of features at a time t+alpha (for example, when the backup task was selected or scheduled)
  a second list at time t+alpha+beta (for example, when the backup task was completed)
In this case, alpha may last at most a few minutes or a few backup scheduling periods apart. In addition, the auxiliary information also indicates that the primary task finished at time t+alpha+gamma which is less than t+alpha+beta. In other words, alpha>gamma−beta. This may indicate that if the backup task were scheduled at or before time t instead of t+alpha, the backup task would have finished before the primary task and would have been useful. Thus, in this example, the computer may label the random sample list of features at time t as useful and the first list of feature at time t+alpha as not useful. In this case, both lists of features may be used to train the model. This allows machine learning algorithm to learn that the backup should be scheduled sooner.

While various types supervised machine learning algorithms may be used to obtain the model, the lists of features may be problematic for many standard algorithms. This is because the training data may contain a large number of lists of features and each list of features may include a large number of possible features. In such as case, the supervised machine learning algorithm must be an efficient means for learning regression functions. Thus, a supervised machine learning algorithm such those that produce a non-linear regression functions that are efficient to compute when evaluating the usefulness of a particular backup task may be used. As an example, a supervised machine learning algorithm for use as described herein may be useful where the model building process is parallel or distributed such that it takes a few hours with millions of training instances (rather than a few days), where the algorithm works well with sparse feature sets, where the algorithm automatically considers contributions of combinations of features, and where the algorithm can incrementally update models as new data becomes available. An example of such an algorithm is Google's Seti machine learning algorithm, though other such algorithms may be equally useful.

Alternatively, an unsupervised learning algorithm (one which takes as input a set of examples, but not labels) could be used to select candidate tasks. In such an anomaly detection approach, tasks that are "outliers" in some statistical sense may be identified, for example by fitting a probability distribution to a data set of backup features and identifying tasks that have low probability under the distribution. While anomalies are by definition rare, they are not necessarily problematic, such as in the case of a large task which ignores most of its data so it processes relatively quickly.

The model may then be used to identify the most useful candidate backup tasks. As shown in block 308 of FIG. 3, while running a new job, the computer selects task for backups using the model. For example, when running a new job, the computer may generate lists of features for all of the tasks of the new job. This may be done periodically, for example every 30 seconds, 1 minute, or more, and in real time. For very short tasks, it may be necessary to reduce this period to the order of a few seconds. For very long tasks (such as those that may take an hour or more), it may be useful to extend this period to reduce load on the master computer, but not so long as to reduce the usefulness of the data. The most current lists of features as well as the model may be input into a classifier tool to determine those which are likely to be most useful. Thus, each task of the new job may be initially considered as a backup candidate. Given the current list of features for each backup candidate, the classifier may output a prediction of the usefulness of scheduling a backup for that task using the model.

The candidate tasks with the highest predicted usefulness may be scheduled for execution based on the number of available worker computers. In this regard, computer 110 may enforce a user-specified budget for the resources consumed by the backup tasks so that each candidate backup task is ranked by expected usefulness, and the computer selects the highest ranking or most useful candidates according to the budget. The scheduled tasks may then be run.

Again, as the lists of features for the tasks of the new job are generated periodically, these lists may be input into the classifier to determine their usefulness according to the model. Thus, the decision about whether and which backup tasks to run can be made in real time while the job is being executed.

As additional jobs and the corresponding backup tasks are run, lists of feature may also be collected for the corresponding backup tasks as described above. A representative list of features for each backup task may be labeled and used to refine the model. As shown by arrow 310, the result is a continuous learning loop which allows the computer 110 to make decisions about which tasks to also execute as backup task while a job is running.

As with the MapReduce example, many distributed applications must operate at large scale, and under tight performance requirements. For model training with the Map Reduce example, while the processing is performed offline and a processing time of a couple of hours to a few days may be acceptable, processing large volumes of data in order to learn and update the model should still be done efficiently. For example, having to save and train new models on all of the data collected historically would be inefficient and would not scale well.

In addition, since many backup candidates will be evaluated for potential usefulness during each MapReduce job, the models produced must also be fast to evaluate. In other words, the time it takes to estimate the usefulness of a of a candidate backup task must be comparable to the time it takes to compute a weighted sum of feature values for the same task. To meet these requirements, the aspects described herein include a machine learning algorithm that efficiently updates the output model in response to new data. After each batch of lists of features and corresponding classification data is collected, the model can be updated incrementally and at low cost, rather than having to train a new model using all of the data that has been collected over time. This speeds up the process of adjusting the model to new data (such as changes in the usefulness of certain backup tasks due to changes in the shared computing environment), and avoids the problems of long term storage of all the list of features and usefulness data from backup tasks of prior jobs.

As noted above the valuation or selection of the relative importance of features may be, and has been in the past, by manually guessing at the value of certain features and looking at jobs which were stuck (not completed) to determine which tasks should also be executed as backup tasks in order to create more backups for those types of tasks and complete similar jobs more efficiently. However, identifying tasks that negatively impact job completion time may be very challenging without the various aspects described herein. As described above, there are many reasons that a task may fail or be slow to finish. Additionally, the state of a task may affect the state of the job in complex ways. For example, a slow task may not be a problem if another bottleneck is delaying resources. On the other hand, the beneficial effects of a backup task may not be observed until dependent tasks (such as MapReduce's reduce workers) have a chance to observe and use the output of a backup. Unlike prior methods, the aspects described herein also allow for scaling to a large number of features, including the features that represent combinations of individual features, and allows automatic tuning data collected at various times to improve the selectivity and specificity of backup tasks for execution.

The usefulness of a particular backup task may not necessarily be apparent at the moment the backup completes, and thus, it can be very useful to have lists of features collected at different times as noted above. For example, referring to the MapReduce example, the output of a successful map backup may not be read by reduce workers (shufflers) who depend on that output because the backup task finished after the original task. Thus, the completion of the backup task may not immediately reduce complaints from worker computers. Thus, as noted above the list of features may be generated based on data collected at the moment a backup task is scheduled, when that task completes, and again at some point after completion of the task.

By having at least three statistical sampling points (or lists of features), several kinds of changes in job state can be used to determine a particular backup task's usefulness. For example, if a significant decrease is observed in the number of shufflers that need a certain worker computer's output between a backup task's scheduling time and its completion time, then the improvement was likely caused by another worker computer working on the same task, and the backup task's list of features may be labeled as not useful. However, when the same decrease in dependent shufflers is seen between a backup task's completion and at the delayed point, then the backup task's list of features may be classified as useful.

An alternative, rather than collecting statistics or lists of features about a backup task at several different times, all backup tasks in a job may be assigned the same usefulness score, corresponding to a global property such as whether the entire job took less time than similar jobs. A disadvantage of this approach is that it fails to distinguish between useful and useless backups within the same job. It would also be possible to use the difference between the completion time of the primary and the completion time of the backup task as the usefulness, for example, consider a backup task useful according to how much sooner its output is available than the output of the corresponding primary. One disadvantage of this approach is that backup tasks that do not resolve bottlenecks may be considered as useful. Another disadvantage is that the output of a primary may be lost (e.g. disk failure), and so backup tasks that produce output after the primary may be incorrectly considered useless.

As an alternative to using the model described above, backup decision rules could be designed that each evaluate a list of features for a given task. For example, one rule could estimate the completion time of each task and schedule a backup whenever the estimate is too large. Another rule could identify the largest shards of data, and suggest them for subsharding. One disadvantage of having multiple independent decision rules is that it is difficult to enforce user specified limits on the number of backups: when the number of rules requesting backups is more than the allowed number of backups, it would not be clear how to select among them. The aspects described herein learns the relative importance of individual features (and combinations of features), making it easy to prioritize backup tasks and use the allowed number of backup tasks effectively.

Although the examples above relate to identifying and running backup tasks, similar steps, processes, devices, systems, etc., may also be used any type of backup such as replacement or subsharded tasks. In addition, the examples above may also be used for more abstract concepts such as for a worker computer. In such an example, backing up a worker computer could, for example, mean backing up or duplicating all computations that have been completed as well as computations that are in-process on the worker computer.

As these and other variations and combinations of the features discussed above can be utilized without departing from the subject matter defined by the claims, the foregoing description of the embodiments should be taken by way of illustration rather than by way of limitation of the subject matter defined by the claims. It will also be understood that the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

The invention claimed is:
1. A method comprising:
running a first job including a plurality of tasks, while also running a backup task for a given task of the plurality of tasks;
generating a first list of features before the backup task is run and a second list of features at a time after the backup task finishes, wherein each feature of the first or second list of features describes an aspect of the execution of the backup task or the first job;
determining, by one or more processors, usefulness of the backup task based on at least both the first list of features and the second list of features, where usefulness of the backup task is determined by whether the output of the backup task is used in order to complete the first job;
assigning a usefulness label to the backup task based on at least the determined usefulness;
generating, using a machine learning algorithm, a model of usefulness of backup tasks based on at least the first list of features and the assigned usefulness label;

while running a second job having a second plurality of tasks, generating a list of features for each task of the second plurality of tasks;

for each given task of the second plurality of tasks, determining a usefulness score based on at least the model and the lists of features for that task;

selecting a subset of tasks from the second plurality of tasks based on at least the usefulness scores; and running a backup task for each task of the subset of tasks.

2. The method of claim 1, wherein assigning a usefulness label includes assigning a value representing whether the backup task was useful to the running of the first job.

3. The method of claim 1, wherein assigning a usefulness label includes determining whether the backup task of the first job was useful, not useful, or possibly useful to the first job.

4. The method of claim 1, wherein selecting the second subset and starting the backup task for each task of the subset of tasks are performed periodically.

5. The method of claim 1, further comprising:
generating a list of features for each backup task for the subset of tasks;
determining usefulness of each backup task for the subset of jobs based on at least the list of features for that backup task; and
updating the model based on at least the determined usefulness of each backup task for the subset of jobs and the list of features for each backup task for the subset of jobs.

6. The method of claim 1, further comprising generating an additional list of features for the backup task at a different time from the first and second lists of features of the backup task, and wherein determining the usefulness of the backup task is further based on at least the additional list of features.

7. The method of claim 6, wherein the backup task was determined to be not useful, and the method further comprises:
receiving auxiliary information indicating that a primary task corresponding to the backup task finished before the backup task and that if the backup task was scheduled at or before the time that the additional list of features was generated, the backup task would have been useful; and
labeling the additional list of features as useful, and wherein generating the model is further based on at least the additional list of features and the useful label of the additional list of features.

8. The method of claim 6 wherein the first list of features is determined at time T, the second list of features is determined at a time T+Δt, and the additional list of features is determined at a time after T+Δt.

9. The method of claim 6, wherein the additional list of features is generated as a random sample before the first list of features is generated.

10. The method of claim 1, further comprising receiving additional information including a starting time and completion time for a primary task associated with the backup task, and wherein determining the usefulness of the backup task is further based on at least the additional information.

11. The method of claim 1, further comprising receiving additional information including a starting time and completion time for the job, and wherein determining the usefulness of the backup task is further based on at least the additional information.

12. A system comprising:
memory storing model of usefulness of backup tasks;
one or more processors configured to access the memory and to:
run a first job including a plurality of tasks, while also running a backup task for a given task of the plurality of tasks;
generate a first list of features before the backup task is run and a second list of features at a time after the backup task finishes, wherein each feature of the first or second list of features describes an aspect of the execution of the backup task or the first job;
determine usefulness of the backup task based on at least both the first list of features and the second list of features, where usefulness of the backup task is determined by whether the output of the backup task is used in order to complete the first job;
assign a usefulness label to the backup task based on at least the determined usefulness;
generate, using a machine learning algorithm, the model of usefulness of backup tasks based on at least the first list of features and the assigned usefulness label;
while running a second job having a second plurality of tasks, generate a list of features for each task of the second plurality of tasks;
for each given task of the second plurality of tasks, determine a usefulness score based on at least the model and the lists of features for that task;
select a subset of tasks from the second plurality of tasks based on at least the usefulness scores; and
run a backup task for each task of the subset of tasks.

13. The system of claim 12, wherein the processor is further configured to assign the usefulness label by assigning a value representing whether the backup task was useful to the running of the first job.

14. The system of claim 12, wherein the processor is further configured to assign the usefulness label by determining whether the backup task of the first job was useful, not useful, or probably useful to the first job.

15. The system of claim 12, wherein the processor is further configured to select the second subset and to start the backup task for each task of the subset of tasks periodically.

16. The system of claim 12, wherein the processor is further configured to:
generate a list of features for each backup task for the subset of tasks;
determine usefulness of each backup task for the subset of jobs based on at least the list of features for that backup task; and
update the model based on at least the determined usefulness of each backup task for the subset of jobs and the list of features for each backup task for the subset of jobs.

17. The system of claim 12, wherein the processor is further configured to generate an additional list of features for the backup task at a different time from the first and second lists of features of the backup task, and wherein determining the usefulness of the backup task is further based on at least the additional list of features.

18. The system of claim 17, wherein when the backup task is determined to be not useful, and the processor is further configured to:
receive auxiliary information indicating that a primary task corresponding to the backup task finished before the backup task and that if the backup task was scheduled at or before the time that the additional list of features was generated, the backup task would have been useful;
label the additional list of features as useful; and
generate the model further based on at least the additional list of features and the useful label of the additional list of features.

19. The system of claim 17 wherein the processor is further configured to determine the first list of features at time T, to determine the second list of features at a time T+Δt, and to determine the additional list of features at a time after T+Δt.

20. The system of claim 17, wherein the processor is further configured to generate the additional list of features as a random sample before the first list of features is generated.

* * * * *